United States Patent
Tanaka

(10) Patent No.: US 9,695,762 B2
(45) Date of Patent: Jul. 4, 2017

(54) INTERNAL COMBUSTION ENGINE PROVIDED WITH VARIABLE COMPRESSION RATIO MECHANISM

(71) Applicant: Hiroyuki Tanaka, Sunto-gun (JP)

(72) Inventor: Hiroyuki Tanaka, Sunto-gun (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 130 days.

(21) Appl. No.: 14/434,027

(22) PCT Filed: Oct. 9, 2012

(86) PCT No.: PCT/JP2012/076142
§ 371 (c)(1),
(2) Date: Apr. 7, 2015

(87) PCT Pub. No.: WO2014/057534
PCT Pub. Date: Apr. 17, 2014

(65) Prior Publication Data
US 2015/0260113 A1    Sep. 17, 2015

(51) Int. Cl.
*F02D 23/00* (2006.01)
*F02B 75/04* (2006.01)
*F02D 41/00* (2006.01)
*F02B 37/18* (2006.01)
*F02D 13/02* (2006.01)
*F02D 15/04* (2006.01)
(Continued)

(52) U.S. Cl.
CPC .......... *F02D 41/0007* (2013.01); *F02B 37/18* (2013.01); *F02B 37/22* (2013.01); *F02D 13/0238* (2013.01); *F02D 13/0269* (2013.01); *F02D 15/04* (2013.01); *F02D 23/00* (2013.01); *F02D 35/027* (2013.01); *F02D 2041/001* (2013.01); *F02D 2700/03* (2013.01); *Y02T 10/142* (2013.01); *Y02T 10/144* (2013.01)

(58) Field of Classification Search
CPC ............ F02D 41/0007; F02D 13/0238; F02D 13/0269; F02D 15/02; F02D 15/04; F02D 23/00; F02D 35/027; F02D 2041/001; F02D 2700/03; F02B 37/18; F02B 37/22; Y02T 10/142; Y02T 10/144
USPC ............ 60/602; 123/78 R, 78 F, 78 A, 78 B
See application file for complete search history.

(56) References Cited

U.S. PATENT DOCUMENTS 6,516,757 B2 * 2/2003 Aoyama ............... F02B 75/048
123/78 R
6,553,949 B1  4/2003 Kolmanovsky et al.
(Continued)

FOREIGN PATENT DOCUMENTS

CN   104603427 A   5/2015
EP   1437495 A2   7/2004
(Continued)

*Primary Examiner* — Thai Ba Trieu
(74) *Attorney, Agent, or Firm* — Andrew Kurth Kenyon LLP

(57) ABSTRACT

This internal combustion engine provided with a variable compression ratio mechanism is equipped with a turbocharger, the opening degree of a wastegate valve is controlled to a target opening degree for each engine operating state, and when the mechanical compression ratio is changed, the target opening degree of the wastegate valve for the current engine operating state is revised.

4 Claims, 12 Drawing Sheets

(51) Int. Cl.
*F02B 37/22* (2006.01)
*F02D 35/02* (2006.01)

(56) References Cited

U.S. PATENT DOCUMENTS

| | | | | |
|---|---|---|---|---|
| 7,100,547 | B2* | 9/2006 | Osamura | F02B 75/048 123/48 B |
| 7,165,517 | B2* | 1/2007 | Sugiyama | F02D 15/02 123/78 R |
| 7,627,417 | B2* | 12/2009 | Akihisa | F02D 15/04 123/78 R |
| 8,746,189 | B2* | 6/2014 | Kawasaki | F02B 75/041 123/78 R |
| 8,789,500 | B2* | 7/2014 | Kawasaki | F02D 15/04 123/78 R |
| 8,794,199 | B2* | 8/2014 | Okada | F02D 15/02 123/78 R |
| 2004/0112310 | A1* | 6/2004 | Osamura | F02D 15/02 123/48 B |
| 2004/0134464 | A1 | 7/2004 | Mogi | |
| 2007/0119413 | A1 | 5/2007 | Lewis et al. | |
| 2008/0190406 | A1 | 8/2008 | Akihisa et al. | |
| 2009/0255518 | A1* | 10/2009 | Gallone | F02D 13/023 123/564 |
| 2012/0031377 | A1 | 2/2012 | Okada et al. | |
| 2014/0261336 | A1* | 9/2014 | Takahashi | F02D 23/00 123/48 R |
| 2015/0219024 | A1 | 8/2015 | Kurashima | |
| 2016/0341154 | A1* | 11/2016 | Okawa | F02D 13/0234 |

FOREIGN PATENT DOCUMENTS

| | | | | |
|---|---|---|---|---|
| EP | 2639430 | A1 | 9/2013 | |
| JP | 2004156464 | A * | 6/2004 | F20D 15/02 |
| JP | 2005069129 | A * | 3/2005 | F20D 15/02 |
| JP | 2006177176 | A | 7/2006 | |
| JP | 2006291934 | A | 10/2006 | |
| JP | 2008095651 | A * | 4/2008 | F20D 15/02 |
| JP | 2008196407 | A | 8/2008 | |
| WO | 2010125694 | A1 | 11/2010 | |
| WO | 2013179465 | A1 | 12/2013 | |
| WO | 2014046059 | A1 | 3/2014 | |

\* cited by examiner

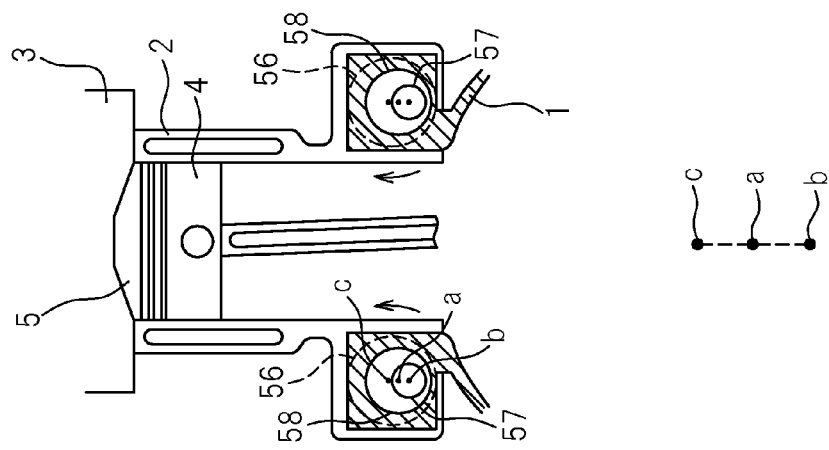
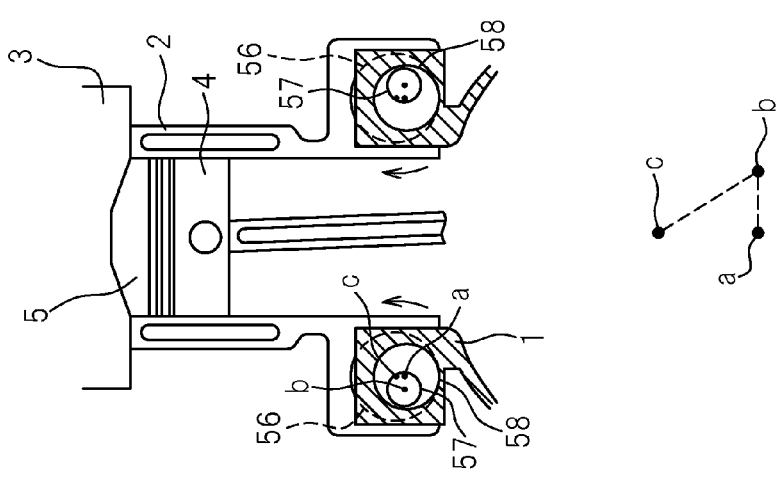
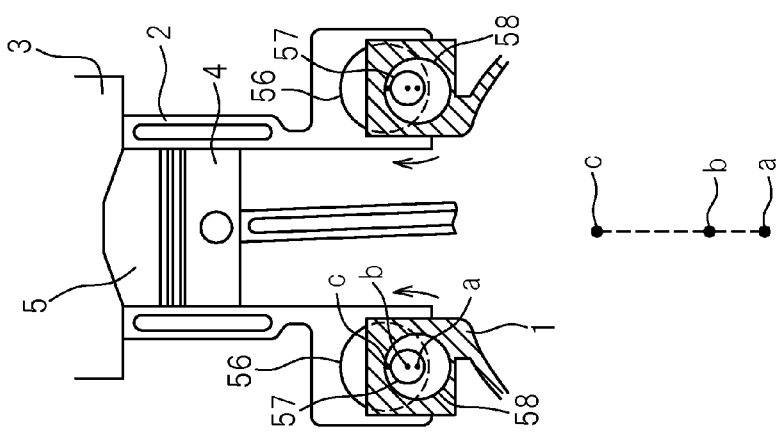

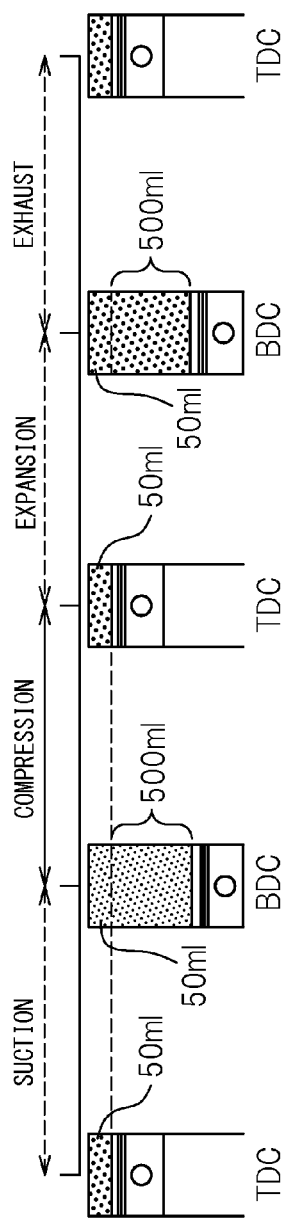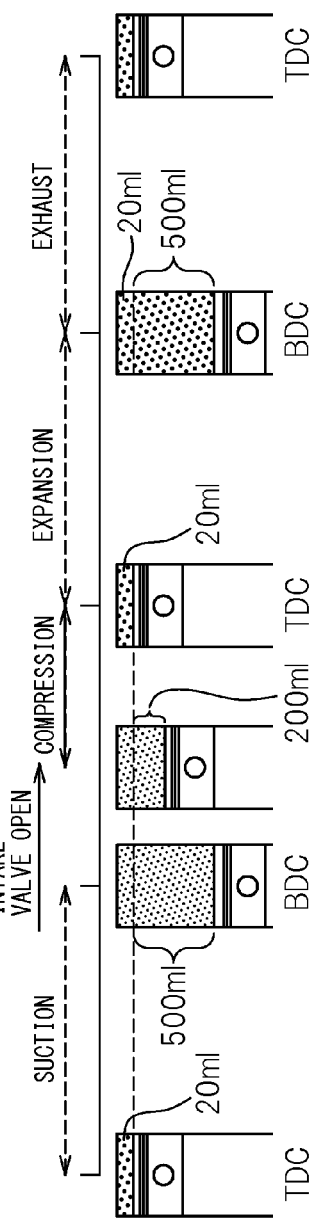

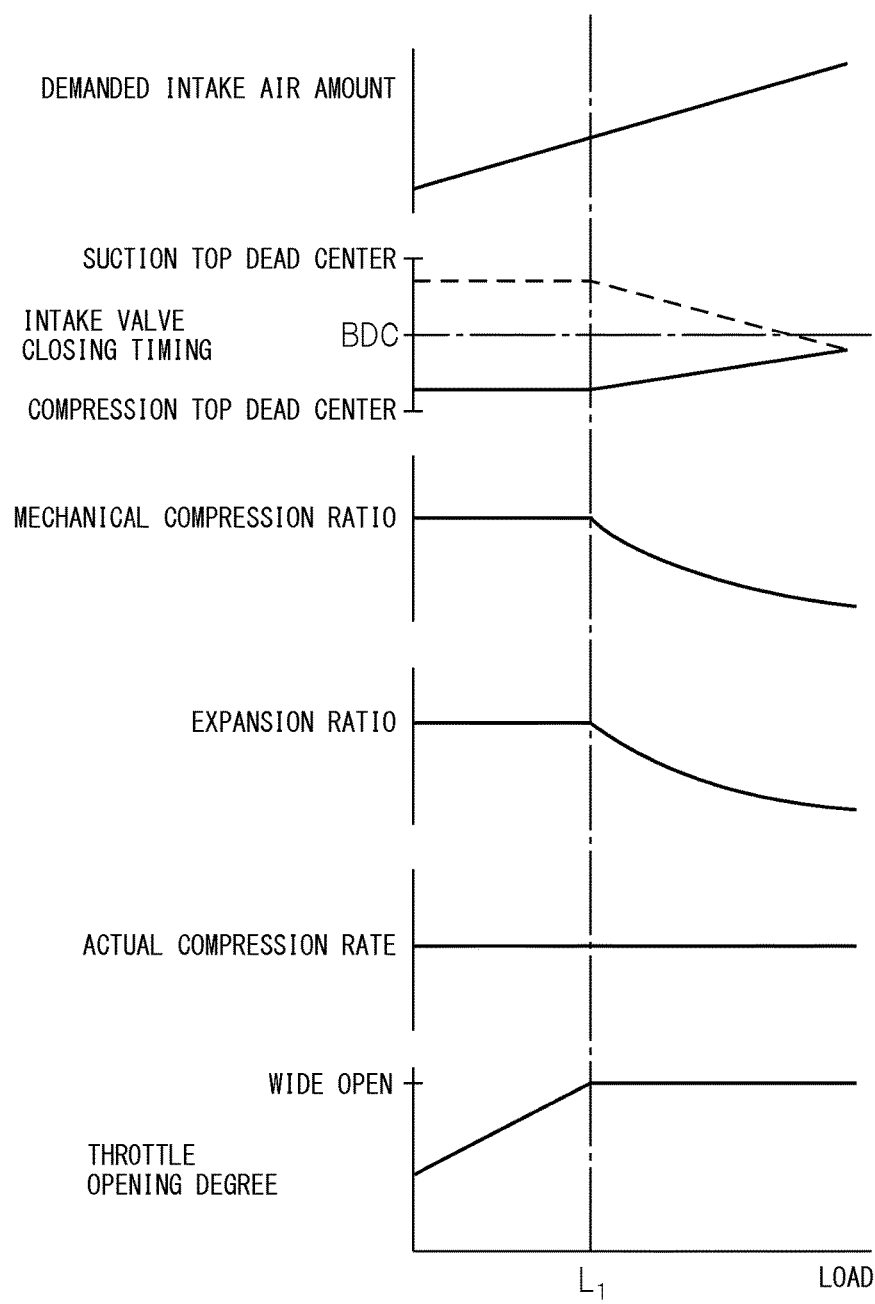

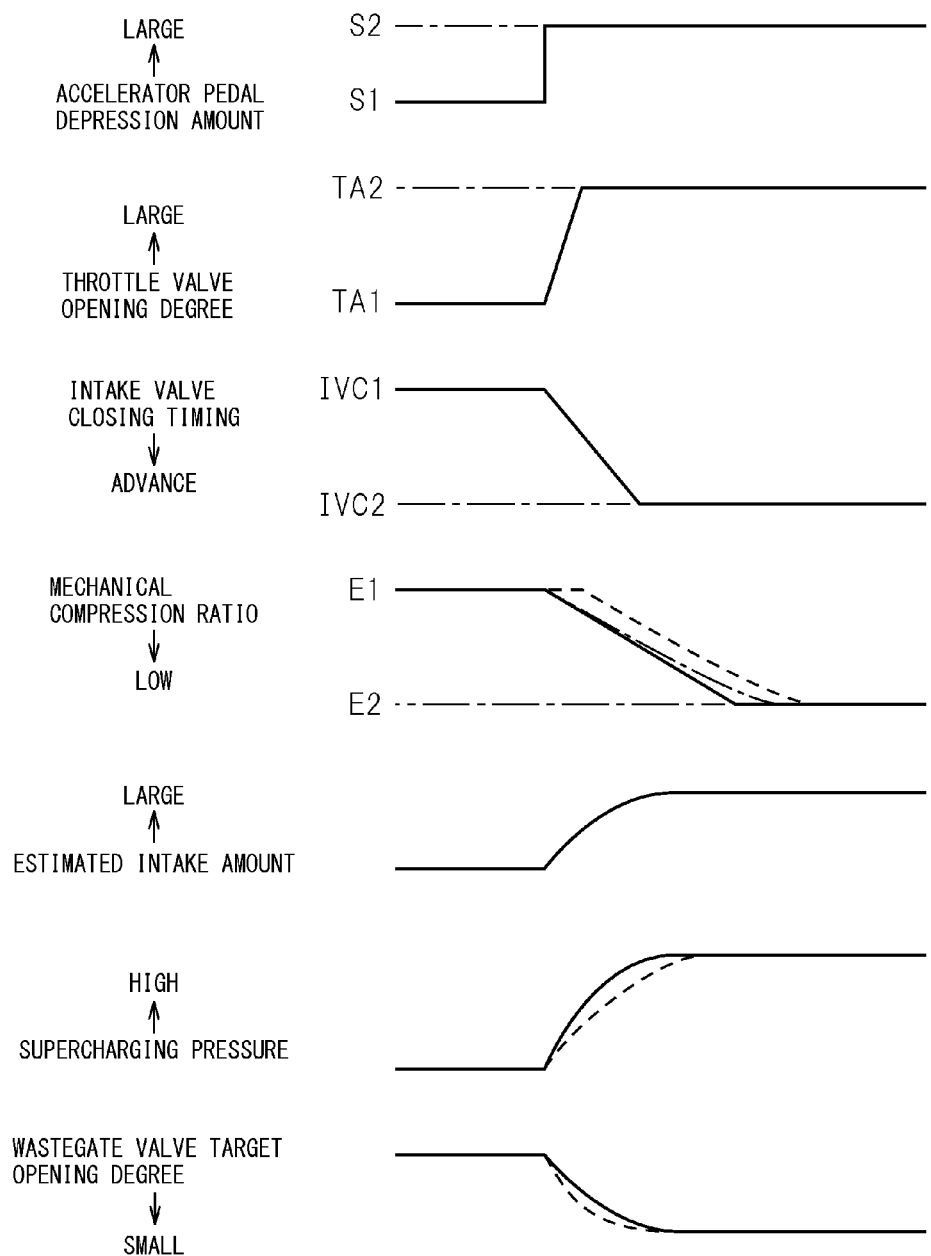

INTERNAL COMBUSTION ENGINE PROVIDED WITH VARIABLE COMPRESSION RATIO MECHANISM

CROSS-REFERENCE TO RELATED APPLICATION

This is a national phase application based on the PCT International Patent Application No. PCT/JP2012/076142 filed Oct. 9, 2012, the entire contents of which are incorporated herein by reference.

TECHNICAL FIELD

The present invention relates to an internal combustion engine which is provided with a variable compression ratio mechanism.

BACKGROUND ART

Known in the art is an internal combustion engine which is provided with a variable compression ratio mechanism which can make a cylinder block move along a cylinder axis with respect to a crankcase so as change the mechanical compression ratio. In general, the lower the engine load, the lower the thermal efficiency, so in such an internal combustion engine which is provided with a variable compression ratio mechanism, the mechanical compression ratio is made higher the lower the engine load so as to raise the expansion ratio and raise the thermal efficiency.

In an internal combustion engine which is provided with a variable compression ratio mechanism as well, it has been proposed to use a turbocharger which utilizes exhaust energy so as to raise the engine output (see PLT 1). For this purpose, a compressor of a turbocharger is arranged in an engine intake system, a turbine of the turbocharger is arranged in an engine exhaust system, and a wastegate passage which bypasses the turbine is provided. The wastegate passage is provided with a wastegate valve. By controlling the opening degree of the wastegate valve, the turbine speed made to change to control the supercharging pressure of the compressor to the desired supercharging pressure.

In such an internal combustion engine which is provided with a variable compression ratio mechanism, a target mechanical compression ratio is set for each current engine operating state and the variable compression ratio mechanism is controlled so that the current target mechanical compression ratio is realized. Further, for the opening degree of the wastegate valve as well, a target opening degree is set so that the desired supercharging pressure for the current engine operating state is realized.

In this regard, an internal combustion engine which is provided with a variable compression ratio mechanism wherein when knocking occurs, the mechanical compression ratio is lowered from the target mechanical compression ratio has also been proposed (see PLT 2).

CITATIONS LIST

Patent Literature

PLT 1: WO2010/125694
PLT 2: Japanese Patent Publication No. 2006-177176A
PLT 3: Japanese Patent Publication No. 2006-291934A
PLT 4: Japanese Patent Publication No. 2008-196407A

SUMMARY OF INVENTION

Technical Problem

In an internal combustion engine which is provided with a variable compression ratio mechanism, if the mechanical compression ratio is lowered in order to suppress knocking despite the engine operating state not changing, if left as is, it will end up not being possible to control the supercharging pressure of the turbocharger to the desired supercharging pressure.

Further, at the time of engine transition when the engine operating state changes, the mechanical compression ratio is changed. At this time, even if controlling the wastegate valve to the target opening degree for each engine operating state at each instant, sometimes it will not be possible to control the supercharging pressure of the turbocharger to the desired supercharging pressure.

Therefore, an object of the present invention is to provide an internal combustion engine provided with a variable compression ratio mechanism which is provided with a turbocharger, controls an opening degree of a wastegate valve to a target opening degree for each engine operating state, and can control a supercharging pressure of the turbocharger to a desired supercharging pressure even if changing a mechanical compression ratio when the engine operating state is not changing or at the time of engine transition.

Solution to Problem

An internal combustion engine which is provided with a variable compression ratio mechanism of the present invention is provided with a turbocharger, controls an opening degree of a wastegate valve to a target opening degree for each engine operating state, and, when changing a mechanical compression ratio, corrects the target opening degree of the wastegate valve for a current engine operating state.

An internal combustion engine which is provided with a variable compression ratio mechanism of the present invention provides the internal combustion engine which is provided with a variable compression ratio mechanism wherein, when changing the mechanical compression ratio to the target mechanical compression ratio for the current engine operating state when the engine operating state is not changing, the target opening degree of the wastegate valve for the current engine operating state is not corrected.

An internal combustion engine which is provided with a variable compression ratio mechanism of the present invention provides the internal combustion engine which is provided with a variable compression ratio mechanism wherein when, to suppress knocking, changing the mechanical compression ratio to the decreasing side when the engine operating state is not changing, the target opening degree of the wastegate valve for the current engine operating state is corrected more to the increasing side the greater the number of cylinders in which knocking did not occur.

Advantageous Effects of Invention

According to the internal combustion engine which is provided with a variable compression ratio mechanism of the present invention, the internal combustion engine is provided with a turbocharger, controls an opening degree of a wastegate valve to a target opening degree for each engine operating state, and, when changing a mechanical compression ratio, corrects the target opening degree of the wastegate valve for a current engine operating state. Change of the mechanical compression ratio causes the expansion ratio to change and the thermal efficiency to also change, so the temperature and pressure of the exhaust gas change. If assuming the engine operating state is not changing and leaving as is the target opening degree of the wastegate valve for the current engine operating state, it will end up not being possible to control the supercharging pressure of the turbocharger to the desired supercharging pressure. Due to this, at this time, the target opening degree of the wastegate valve for the current engine operating state is corrected so the supercharging pressure of the turbocharger can be controlled to the desired supercharging pressure.

Further, when changing the mechanical compression ratio at the time of engine transition, if leaving as is the target opening degree of the wastegate valve for the current engine operating state which changes each instant due to the response delay of the mechanical compression ratio, sometimes it is not possible to control the supercharging pressure of the turbocharger to the desired supercharging pressure. Due to this, at this time, the constantly changing target opening degree of the wastegate valve for the current engine operating state is corrected so the supercharging pressure of the turbocharger can be controlled to the desired supercharging pressure.

According to the internal combustion engine which is provided with a variable compression ratio mechanism of the present invention, in the internal combustion engine which is provided with a variable compression ratio mechanism, the target opening degree of the wastegate valve for the current engine operating state is one which is predicated on the target mechanical compression ratio for the current engine operating state being realized, so at the time of changing the mechanical compression ratio to the target mechanical compression ratio for the current engine operating state when the engine operating state is not changing, the target opening degree of the wastegate valve for the current engine operating state is not corrected.

According to the internal combustion engine which is provided with a variable compression ratio mechanism of the present invention, in the internal combustion engine which is provided with a variable compression ratio mechanism, when, to suppress knocking, changing the mechanical compression ratio to the decreasing side when the engine operating state is not changing, the target opening degree of the wastegate valve for the current engine operating state is corrected more to the increasing side the greater the number of cylinders in which knocking did not occur. The actual mechanical compression ratio of a cylinder at which knocking occurs becomes higher than the actual mechanical compression ratio of a cylinder at which knocking has not occurred. If lowering the overall mechanical compression ratio so as to suppress knocking, at the cylinders at which knocking did not occur, the actual mechanical compression ratio will greatly fall and the thermal efficiency will also greatly deteriorate and the exhaust gas temperature and pressure will become higher, so the larger the number of cylinders at which knocking did not occur, the more to the increasing side the target opening degree of the wastegate valve for the current engine operating state is corrected, so it is possible to control the supercharging pressure of the turbocharger to the desired supercharging pressure and keep the supercharging pressure from excessively rising.

BRIEF DESCRIPTION OF DRAWINGS

FIG. 3(A) to FIG. 3(C) are side cross-sectional views of an internal combustion engine which is shown schematically.
FIG. 8(A) and FIG. 8(B) are views for explaining a normal cycle and superhigh expansion ratio cycle.
FIG. 9 is a view which shows changes in a mechanical compression ratio etc. in accordance with an engine load.
FIG. 14 is a time chart which shows control at the time of engine transition.

DESCRIPTION OF EMBODIMENTS

Figure 1:
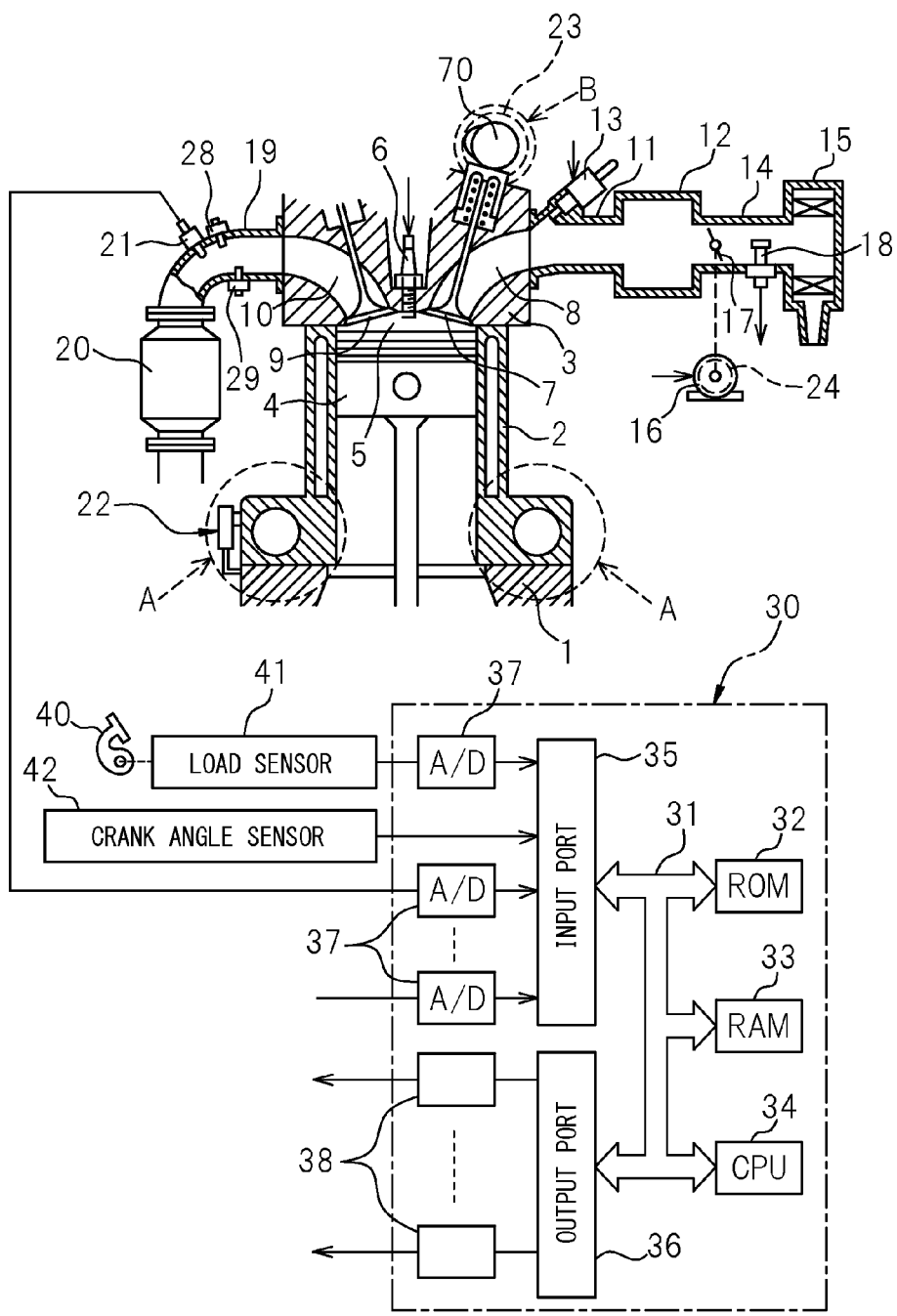
FIG. 1 is an overview of an internal combustion engine.

FIG. 1 shows a side cross-sectional view of an internal combustion engine which is provided with a variable compression ratio mechanism according to the present invention. Referring to FIG. 1, 1 indicates a crankcase, 2 indicates a cylinder block, 3 indicates a cylinder head, 4 indicates a piston, 5 indicates a combustion chamber, 6 indicates a spark plug which is arranged at the top center of a combustion chamber 5, 7 indicates an intake valve, 8 indicates an intake port, 9 indicates an exhaust valve, and 10 indicates an exhaust port. Each intake port 8 is connected through an intake runner 11 to a surge tank 12. At each intake runner 11, a fuel injector 13 is arranged for injecting fuel toward the inside of the respectively corresponding intake port 8. Note that, each fuel injector 13 may be arranged in a combustion chamber 5 instead of attached to an intake runner 11.

The surge tank 12 is connected to an air cleaner 15 through an intake duct 14. Inside the intake duct 14, a throttle valve 17 which is driven by an actuator 16 and an intake air detector 18 which uses for example hot wires are arranged. The exhaust port 10 is connected through an exhaust manifold 19 to a catalyst device 20 which has for example a three-way catalyst built into it. Inside the exhaust manifold 19, an air-fuel ratio sensor 21 is arranged.

On the other hand, in the embodiment which is shown in FIG. 1, at the connecting part of the crankcase 1 and the cylinder block 2, a variable compression ratio mechanism A is provided which can change the relative positions of the crankcase 1 and the cylinder block 2 in the cylinder axial direction and thereby change the volume of the combustion chamber 5 when the piston 4 is positioned at compression top dead center. Furthermore, an actual compression action start timing changing mechanism B which is able to change the start timing of the actual compression action is provided. Note that, in the embodiment which is shown in FIG. 1, this actual compression action start timing changing mechanism B is comprised of a variable valve timing mechanism which can control the closing timing of the intake valve 7.

As shown in FIG. 1, the crankcase 1 and the cylinder block 2 have a relative position sensor 22 attached to them for detecting the relative positional relationship between the crankcase 1 and the cylinder block 2. From this relative position sensor 22, an output signal which shows the change in distance between the crankcase 1 and the cylinder block 2 is output. Further, the variable valve timing mechanism B has a valve timing sensor 23 which generates an output signal which shows a closing timing of the intake valve 7 attached to it. The actuator 16 for driving the throttle valve has a throttle opening degree sensor 24 which generates an output signal which shows the throttle valve opening degree attached to it.

An electronic control unit 30 is comprised of a digital computer. This is provided with components connected to each other through a bidirectional bus 31 such as a ROM (read only memory) 32, RAM (random access memory) 33, CPU (microprocessor) 34, input port 35, and output port 36. Output signals of the intake air detector 18, the air-fuel ratio sensor 21, relative position sensor 22, valve timing sensor 23, and throttle opening degree sensor 24 are input through respectively corresponding AD converters 37 to an input port 35. Further, the accelerator pedal 40 is connected to a load sensor 41 which generates an output voltage which is proportional to the amount of depression L of the accelerator pedal 40. The output voltage of the load sensor 41 is input through a corresponding AD converter 37 to the input port 35. Furthermore, the input port 35 is connected to a crank angle sensor 42 which generates an output pulse each time a crankshaft rotates by for example 30°. On the other hand, the output port 36 is connected through a corresponding drive circuit 38 to each spark plug 6, fuel injector 13, throttle valve drive-use actuator 16, variable compression ratio mechanism A, and variable valve timing mechanism B.

Figure 2:
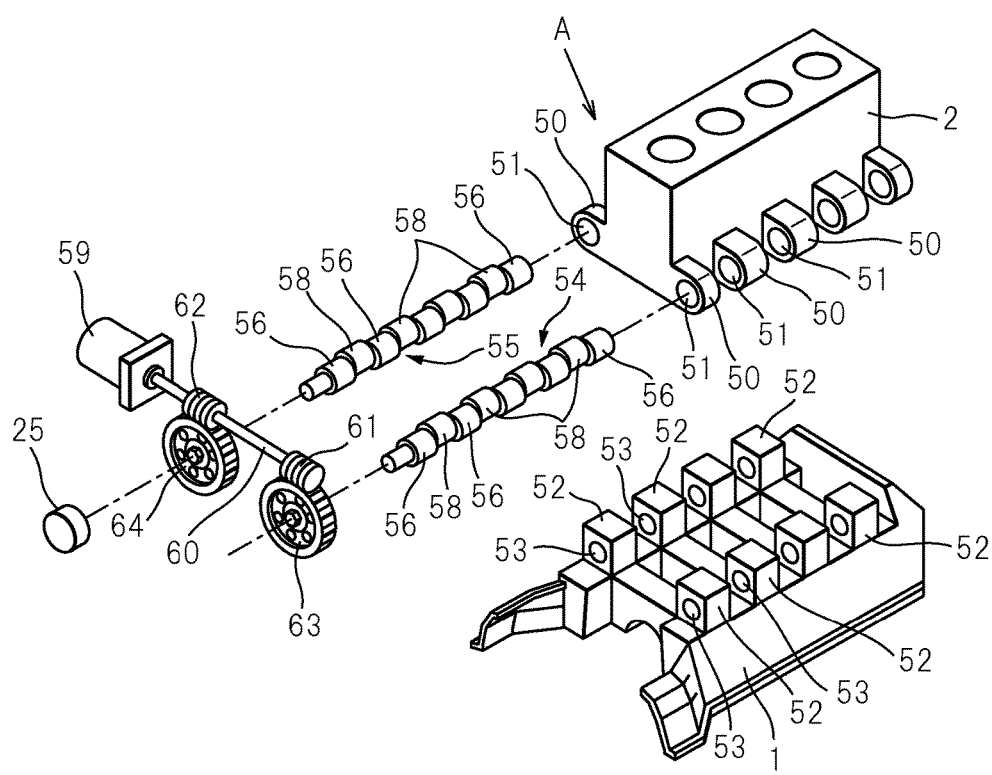
FIG. 2 is a disassembled perspective view of a variable compression ratio mechanism.

FIG. 2 is a disassembled perspective view of the variable compression ratio mechanism A which is shown in FIG. 1, while FIG. 3(A) to FIG. 3(C) are side cross-sectional views of the schematically illustrated internal combustion engine. Referring to FIG. 2, at the bottom of both sides of the cylinder block 2, a plurality of projecting parts 50, that is, cylinder block supports, are formed spaced apart from each other. Inside these projecting parts 50, cam insertion holes 51 of round cross-sectional shapes are formed. On the other hand, at the top surface of the crankcase 1, a plurality of projecting parts 52, that is, crankcase side supports, are formed which are spaced apart from each other and fit between the corresponding projecting parts 50. Inside these projecting parts 52 as well, round cross-section cam insertion holes 53 are formed.

As shown in FIG. 2, a pair of cam shafts 54 and 55 are provided. On these cam shafts 54 and 55, at every other position, a concentric part 58 which is inserted rotatably into a cam insertion hole 53 is positioned. These concentric parts 58 are coaxial with the axes of rotation of the cam shafts 54, 55. On the other hand, at both sides of each concentric part 58, as shown in FIG. 3(A) to FIG. 3(C), eccentric parts 57 which are arranged eccentrically with respect to the axes of rotation of the cam shafts 54, 55 are positioned. Other circular cams 56 are attached eccentrically on these eccentric parts 57 in a rotatable manner. That is, the eccentric parts 57 engage with the eccentric holes which are formed in the circular cams 56, while the circular cams 56 pivot about the eccentric parts 57 centered about the eccentric holes. As shown in FIG. 2, these circular cams 56 are arranged at both sides of each concentric part 58. These circular cams 56 are rotatably inserted into the corresponding cam insertion holes 51. Further, as shown in FIG. 2, the cam shaft 55 has a cam rotational angle sensor 25 which generates an output signal which expresses the rotational angle of the cam shaft 55 attached to it.

If making the concentric parts 58 of the cam shafts 54 and 55 rotate from the state such as shown in FIG. 3(A) in the mutually opposite directions as shown by the solid arrows in FIG. 3(A), the eccentric parts 57 move in directions away from each other, so the circular cams 56 rotate in opposite directions from the concentric parts 58 in the cam insertion holes 51 and, as shown in FIG. 3(B), the positions of the eccentric parts 57 change from high positions to intermediate height positions. If next making the concentric parts 58 further rotate in the direction shown by the arrow, as shown by FIG. 3(C), the eccentric parts 57 become the lowest position.

Note that, FIG. 3(A), FIG. 3(B), and FIG. 3(C) show the positional relations among the center "a" of the concentric part 58, the center "b" of the eccentric part 57, and the center "c" of the circular cam 56 at their respective states.

As will be understood from a comparison of FIG. 3(A) to FIG. 3(C), the relative positions of the crankcase 1 and the cylinder block 2 are determined by the distance between the center "a" of the concentric part 58 and the center "c" of the circular cam 56. The larger the distance between the center "a" of the concentric part 58 and the center "c" of the circular cam 56 is made, the further the cylinder block 2 is away from the crankcase 1. That is, the variable compression ratio mechanism A uses a crank mechanism using a rotating cam so as to make the relative positions between the crankcase 1 and cylinder block 2 change. If the cylinder block 2 moves away from the crankcase 1, the volume of the combustion chamber 5 when the piston 4 is positioned at compression top dead center increases. Therefore, by rotating the cam shafts 54 and 55, the volume of the combustion chamber 5 when the piston 4 is positioned at compression top dead center can be changed.

As shown in FIG. 2, to make the cam shafts 54 and 55 rotate in opposite directions, the shaft 60 of a drive motor 59 is formed with a pair of worms 61 and 62 with opposite spiral directions. The worm gears 63 and 64 which engage with these worms 61 and 62 are fastened to the ends of the cam shafts 54 and 55. In this embodiment, by operating the drive motor 59, the volume of the combustion chamber 5 when the piston 4 is positioned at compression top dead center can be changed over a wide range.

Figure 4:
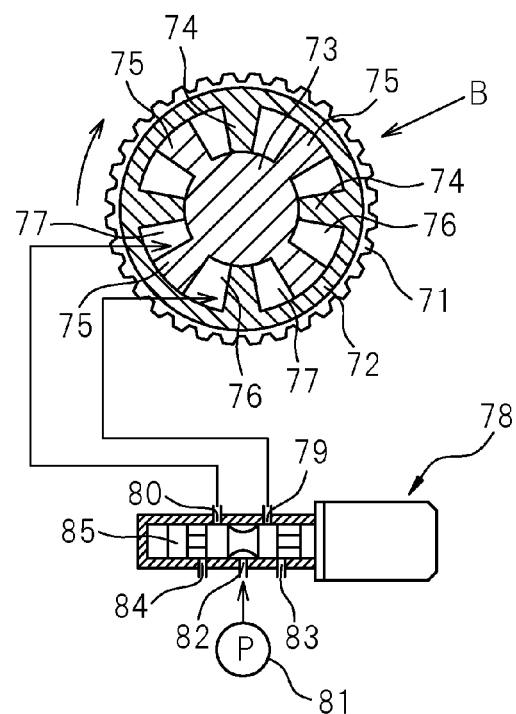
FIG. 4 is a view which shows a variable valve timing mechanism.

On the other hand, FIG. 4 shows a variable valve timing mechanism B which is attached to the end part of the cam shaft 70 for driving the intake valve 7 at FIG. 1. If referring to FIG. 4, this variable valve timing mechanism B is provided with a timing pulley 71 which is made to rotate in the arrow direction by the engine crankshaft through the timing belt, a cylindrical housing 72 which rotates together with the timing pulley 71, a shaft 73 which can rotate together with the intake valve drive-use cam shaft 70 and which can rotate with respect to the cylindrical housing 72, a plurality of partition walls 74 which extend from the inside circumferential wall of the cylindrical housing 72 to the outside wall circumference of the shaft 73, and vanes 75 which extend from the outside circumferential surface of the shaft 73 to the inside circumferential surface of the cylindrical housing 72 between the partition walls 74. At the two sides of each vane 75, an advance-use hydraulic chamber 76 and a retardation-use hydraulic chamber 77 are formed.

The feed of working oil to the hydraulic chambers 76 and 77 is controlled by a working oil feed control valve 78. This working oil feed control valve 78 is provided with hydraulic ports 79 and 80 which are respectively connected to the hydraulic chambers 76 and 77, a feed port 82 of working oil which is discharged from the hydraulic pump 81, a pair of drain ports 83 and 84, and a spool valve 85 which controls the connections and the disconnections of the ports 79, 80, 82, 83, and 84.

When advancing the phase of the cam of the intake valve drive-use cam shaft 70, the spool valve 85 is made to move to the right in FIG. 4, working oil which is supplied from the feed port 82 is supplied to the advance-use hydraulic chamber 76 through a hydraulic port 79, and working oil in the retardation-use hydraulic chamber 77 is exhausted from the drain port 84. At this time, the shaft 73 is made to rotate relative to the cylindrical housing 72 in the arrow direction.

As opposed to this, when retarding the phase of the cam of the intake valve drive-use cam shaft 70, the spool valve 85 is made to move to the left in FIG. 4, working oil which is supplied from the feed port 82 is supplied to the retardation-use hydraulic chamber 77 through the hydraulic port 80, and working oil in the advance-use hydraulic chamber 76 is exhausted from the drain port 83. At this time, the shaft 73 is made to rotate relative to the cylindrical housing 72 in the opposite direction to the arrow mark.

When the shaft 73 is made to rotate relative to the cylindrical housing 72, if the spool valve 85 is returned to the neutral position which is shown in FIG. 4, the relative rotation operation of the shaft 73 is made to stop and the shaft 73 is held at the relative rotation position at that time. Therefore, the variable valve timing mechanism B can be used to make the phase of the cam of the intake valve drive-use cam shaft 70 advance or can be used to make it retarded by exactly a desired amount.

Figure 5:
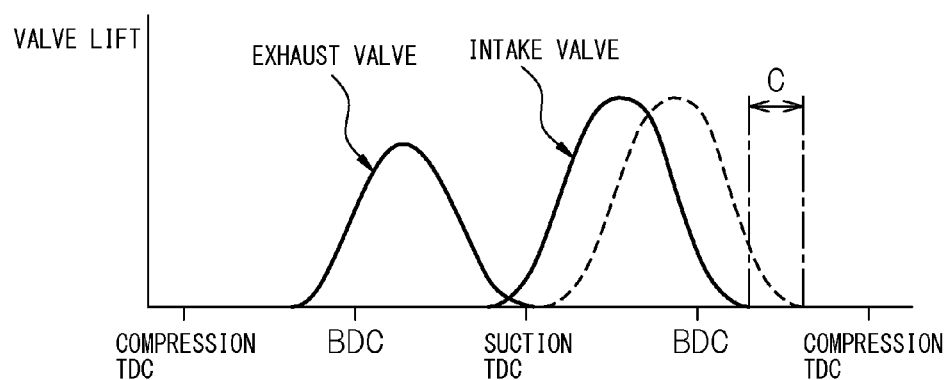
FIG. 5 is a view which shows lift amounts of an intake valve and an exhaust valve.

In FIG. 5, the solid line shows when the variable valve timing mechanism B is used to make the phase of the cam of the intake valve drive-use cam shaft 70 the most advanced, while the broken line shows when it is used to make the phase of the cam of the intake valve drive-use cam shaft 70 the most retarded. Therefore, the opening time period of the intake valve 7 can be freely set between the range which is shown by the solid line and the range which is shown by the broken line in FIG. 5. Therefore, the closing timing of the intake valve 7 can also be set to any crank angle in the range which is shown by the arrow C in FIG. 5.

The variable valve timing mechanism B which is shown in FIG. 1 and FIG. 4 shows one example. For example, it is possible to use a variable valve timing mechanism which enables only the closing timing of the intake valve to be changed while maintaining the opening timing of the intake valve constant or various other types of variable valve timing mechanisms.

Next, referring to FIG. 6(A) to FIG. 6(C), the meaning of the terms which are used in the present application will be explained. Note that, FIGS. 6(A), (B), and (C) show engines with combustion chamber volumes of 50 ml and piston stroke volumes of 500 ml for explanatory purposes. In these FIGS. 6(A), (B), and (C), the "combustion chamber volume" expresses the volume of a combustion chamber when the piston is positioned at top dead center of the compression stroke.

Figure 6A:
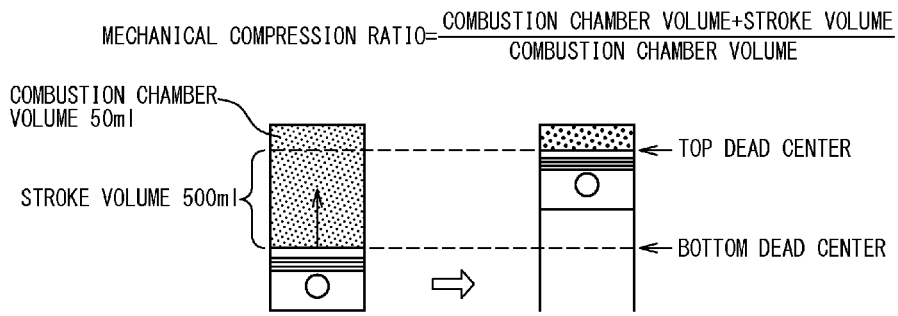
FIG. 6(A) to FIG. 6(C) are views for explaining an mechanical compression ratio, actual compression ratio, and expansion ratio.

FIG. 6(A) explains the mechanical compression ratio. The mechanical compression ratio is a value which is mechanically determined from only the piston stroke volume at the time of the compression stroke and the combustion chamber volume. This mechanical compression ratio is expressed by (combustion chamber volume+stroke volume)/combustion chamber volume. In the example which is shown in FIG. 6(A), this mechanical compression ratio becomes (50 ml+500 ml)/50 ml=11.

Figure 6B:
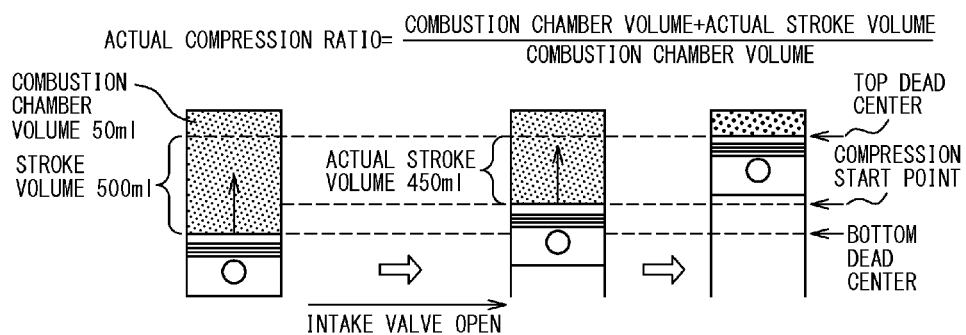

FIG. 6(B) explains the actual compression ratio. This actual compression ratio is a value which is determined from the actual piston stroke volume from when the compression action actually is started to when the piston reaches top dead center and the combustion chamber volume. This actual compression ratio is expressed by (combustion chamber volume+actual stroke volume)/combustion chamber volume. That is, as shown in FIG. 6(B), even if the piston starts to rise in the compression stroke, no compression action is performed while the intake valve is open. The actual compression action is started after the intake valve closes. Therefore, the actual compression ratio is expressed as shown above using the actual stroke volume. In the example which is shown in FIG. 6(B), the actual compression ratio becomes (50 ml+450 ml)/50 ml=10.

Figure 6C:
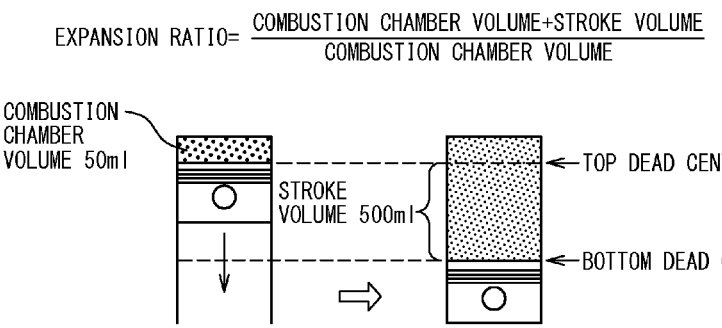

FIG. 6(C) explains the expansion ratio. The expansion ratio is a value which is determined from the stroke volume of the piston and the combustion chamber volume at the time of the expansion stroke. This expansion ratio is expressed by the (combustion chamber volume+stroke volume)/combustion chamber volume. In the example which is shown in FIG. 6(C), this expansion ratio becomes (50 ml+500 ml)/50 ml=11.

Next, while referring to FIG. 7 and FIG. 8(A) and FIG. 8(B), the super expansion ratio cycle which is used in the present invention will be explained. Note that, FIG. 7 shows the relationship between the theoretical thermal efficiency and the expansion ratio, while FIG. 8(A) and FIG. 8(B) show a comparison between a normal cycle and a superhigh expansion ratio cycle which are selectively used in accordance with the load in the present invention.

FIG. 8(A) shows the normal cycle in the case where the intake valve closes near bottom dead center and the compression action by the piston is started from near substantially bottom dead center of the intake stroke. In the example which is shown in FIG. 8(A), in the same way as the examples which are shown in FIGS. 6(A), (B), (C), the combustion chamber volume is made 50 ml and the piston stroke volume is made 500 ml. As will be understood from FIG. 8(A), in the normal cycle, the mechanical compression ratio is (50 ml+500 ml)/50 ml=11, the actual compression ratio is also about 11, and the expansion ratio also becomes (50 ml+500 ml)/50 ml=11. That is, in a normal internal combustion engine, the mechanical compression ratio, the actual compression ratio, and the expansion ratio become substantially equal.

Figure 7:
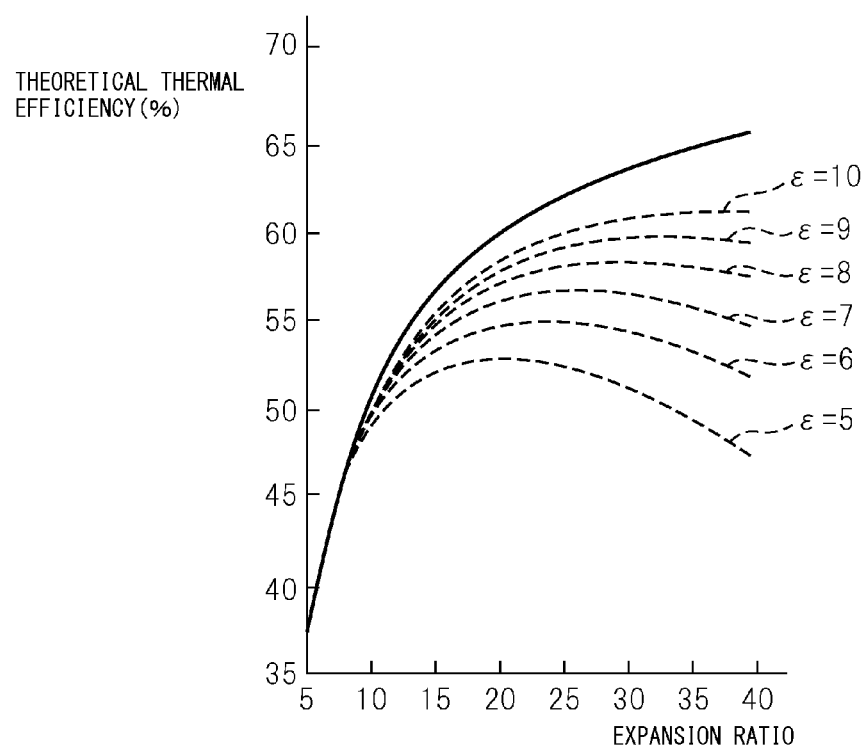
FIG. 7 is a view which shows a relationship between a theoretical thermal efficiency and an expansion ratio.

The solid line in FIG. 7 shows the change in the theoretical thermal efficiency in the case where the actual compression ratio and the expansion ratio are substantially equal, that is, at the time of a normal cycle. In this case, it is learned that the larger the expansion ratio becomes, that is, the higher the actual compression ratio becomes, the higher the theoretical thermal efficiency becomes. Therefore, in the normal cycle, to raise the theoretical thermal efficiency, it is sufficient to raise the actual compression ratio. However, due to restrictions on the occurrence of knocking at the time of engine high load operation, the actual compression ratio can only be raised up to about 12 even at the maximum.

Therefore, in a normal cycle, the theoretical thermal efficiency cannot be made sufficiently high.

On the other hand, in view of this situation, studies have been conducted to strictly separate the mechanical compression ratio and the actual compression ratio while raising the theoretical thermal efficiency. As a result, it was discovered that in the theoretical thermal efficiency, the expansion ratio is dominant and that the actual compression ratio does not have almost any effect on the theoretical thermal efficiency. That is, if raising the actual compression ratio, the explosive force rises, but a large energy is required for compression. Therefore, even if raising the actual compression ratio, the theoretical thermal efficiency does not become much larger at all.

As opposed to this, if increasing the expansion ratio, the time period during which a pushdown force acts on the piston at the time of the expansion stroke becomes longer and therefore the time period during which the piston gives a rotational force to the crankshaft becomes longer. Therefore, the greater the expansion ratio is made, the more the theoretical thermal efficiency rises. The broken line $\epsilon=10$ of FIG. 7 shows the theoretical thermal efficiency when raising the expansion ratio in the state setting the actual compression ratio at 10. In this way, it is learned that there is no large difference between the amount of rise of the theoretical thermal efficiency when raising the expansion ratio in the state maintaining the actual compression ratio $\epsilon$ at a low value and the amount of rise of the theoretical thermal efficiency when making the actual compression ratio increase together with the expansion ratio as shown by the solid line of FIG. 7.

If the actual compression ratio is maintained at a low value in this way, knocking will never occur. Therefore if raising the expansion ratio in a state maintaining the actual compression ratio at a low value, it is possible to prevent the occurrence of knocking while greatly raising the theoretical thermal efficiency. FIG. 8(B) shows one example of using the variable compression ratio mechanism A and the variable valve timing mechanism B to maintain the actual compression ratio at a low value while raising the expansion ratio.

If referring to FIG. 8(B), in this example, the variable compression ratio mechanism A is used to decrease the combustion chamber volume from 50 ml to 20 ml. On the other hand, the variable valve timing mechanism B is used to retard the closing timing of the intake valve until the actual piston stroke volume is reduced from 500 ml to 200 ml. As a result, in this example, the actual compression ratio becomes (20 ml+200 ml)/20 ml=11, while the expansion ratio becomes (20 ml+500 ml)/20 ml=26. In the normal cycle which is shown in FIG. 8(A), as explained above, the actual compression ratio becomes about 11 and the expansion ratio becomes 11. If compared with this case, in the case which is shown in FIG. 8(B), it is learned that only the expansion ratio is raised to 26. This is called the "superhigh expansion ratio cycle".

Generally speaking, in an internal combustion engine, the lower the engine load, the worse the thermal efficiency. Therefore, to improve the thermal efficiency at the time of engine operation, that is, to improve the fuel economy, it is necessary to raise the thermal efficiency when the engine load is low. On the other hand, in the superhigh expansion ratio cycle which is shown in FIG. 8(B), to enable the actual piston stroke volume at the time of the compression stroke to be made smaller, the amount of intake air which is sucked into a combustion chamber 5 becomes smaller. Therefore, this superhigh expansion ratio cycle can be employed only when the engine load is relatively low. Therefore, in the present invention, when the engine load is relatively low, the superhigh expansion ratio cycle which is shown in FIG. 8(B) is used, while the normal cycle which is shown in FIG. 8(A) is used at the time of the engine high load operation.

Next, referring to FIG. 9, the operational control as a whole will be schematically explained. FIG. 9 shows the changes in the intake air amount, intake valve closing timing, mechanical compression ratio, expansion ratio, actual compression ratio, and opening degree of the throttle valve 17 in accordance with the engine load at a certain engine speed. Note that, FIG. 9 shows the case where the mean air-fuel ratio in a combustion chamber 5 is feedback controlled to the stoichiometric air-fuel ratio based on the output signal of the air-fuel ratio sensor 21 so that the three-way catalyst in the catalyst device 20 can be used to simultaneously reduce the unburned HC, CO, and $NO_X$ in the exhaust gas.

Now, as explained above, at the time of engine high load operation, the normal cycle which is shown in FIG. 8(A) is performed. Therefore, as shown in FIG. 9, at this time, the mechanical compression ratio is made low, so the expansion ratio is low. As shown by the solid line in FIG. 9, the closing timing of the intake valve 7 is advanced as shown by the solid line in FIG. 5. Further, at this time, the amount of intake air is large. At this time, the opening degree of the throttle valve 17 is held wide open, so the pumping loss becomes zero.

On the other hand, as shown in FIG. 9 by the solid line, if the engine load becomes lower, along with this, the closing timing of the intake valve 7 is retarded so as to reduce the amount of intake air. Further, at this time, the mechanical compression ratio is increased as the engine load becomes lower as shown in FIG. 9 so that the actual compression ratio is held substantially constant. Therefore, the expansion ratio is also increased as the engine load becomes lower. Note that, at this time as well, the throttle valve 17 is held in the wide open state. Therefore the amount of intake air which is supplied to the inside of the combustion chamber 5 is controlled without relying on the throttle valve 17 and by changing the closing timing of the intake valve 7.

In this way, when the engine load becomes lower from the engine high load operation state, the mechanical compression ratio is made to increase under a substantially constant actual compression ratio as the amount of intake air decreases. That is, the volume of the combustion chamber 5 when the piston 4 reaches compression top dead center is made to decrease in proportion to the decrease in the amount of intake air. Therefore, the volume of the combustion chamber 5 when the piston 4 reaches compression top dead center changes in proportion to the amount of intake air. Note that, at this time, in the example which is shown in FIG. 9, the air-fuel ratio in the combustion chamber 5 becomes the stoichiometric air-fuel ratio, so the volume of the combustion chamber 5 when the piston 4 reaches compression top dead center changes in proportion to the amount of fuel.

If the engine load becomes further lower, the mechanical compression ratio is made to further increase. If the engine load falls down to the intermediate load L1 somewhat near the low load, the mechanical compression ratio reaches the limit mechanical compression ratio (upper limit mechanical compression ratio) forming the structural limit of the combustion chamber 5. When the mechanical compression ratio reaches the limit mechanical compression ratio, in the region with a load lower than the engine load L1 when the mechanical compression ratio reaches the limit mechanical compression ratio, the mechanical compression ratio is held at the limit mechanical compression ratio. Therefore, at the time of low load side engine medium load operation and at the time of engine low load operation, that is, at the engine low load operation side, the mechanical compression ratio becomes maximum and the expansion ratio also becomes maximum. In other words, at the engine low load operation side, the mechanical compression ratio is made maximum so that the maximum expansion ratio is obtained.

On the other hand, in the embodiment which is shown in FIG. 9, if the engine load falls to L1, the closing timing of the intake valve 7 becomes the limit closing timing by which the amount of intake air which is supplied to the inside of a combustion chamber 5 can be controlled. If the closing timing of the intake valve 7 reaches the limit closing timing, in the region of a lower load than the engine load L1 when the closing timing of the intake valve 7 reached the limit closing timing, the closing timing of the intake valve 7 is held at the limit closing timing.

If the closing timing of the intake valve 7 is held at the limit closing timing, it is no longer possible to control the intake air amount by changing the closing timing of the intake valve 7. In the embodiment which is shown in FIG. 9, at this time, that is, in the region of a load lower than the engine load L1 when the closing timing of the intake valve 7 reaches the limit closing timing, the throttle valve 17 is used to control the amount of intake air which is supplied to the inside of the combustion chamber 5. The lower the engine load, the smaller the opening degree of the throttle valve 17 is made.

On the other hand, it is possible to control the amount of intake air without relying on the throttle valve 17 by advancing the closing timing of the intake valve 7 as the engine load becomes lower as shown by the broken line in FIG. 9. Therefore, if expressing the invention to be able to include both the case which is shown by the solid line in FIG. 9 and the case which is shown by the broken line, in the embodiment according to the present invention, as the engine load becomes lower, the closing timing of the intake valve 7 is made to move in a direction away from suction bottom dead center BDC until the limit closing timing L1 where the amount of intake air which is supplied to the inside of the combustion chamber can be controlled. In this way, the intake air amount can be controlled by changing the closing timing of the intake valve 7 as shown by the solid line in FIG. 9 and can be controlled by changing it as shown by the broken line.

As explained above, in the superhigh expansion ratio cycle which is shown in FIG. 8(B), the expansion ratio is made 26. This expansion ratio is preferably as high as possible, but as will be understood from FIG. 7, a considerably high theoretical thermal efficiency can be obtained if 20 or more compared with the practically usable lower limit actual compression ratio $\epsilon$=5. Therefore in the present embodiment, the variable compression ratio mechanism A is formed so that the expansion ratio becomes 20 or more.

Figure 10:
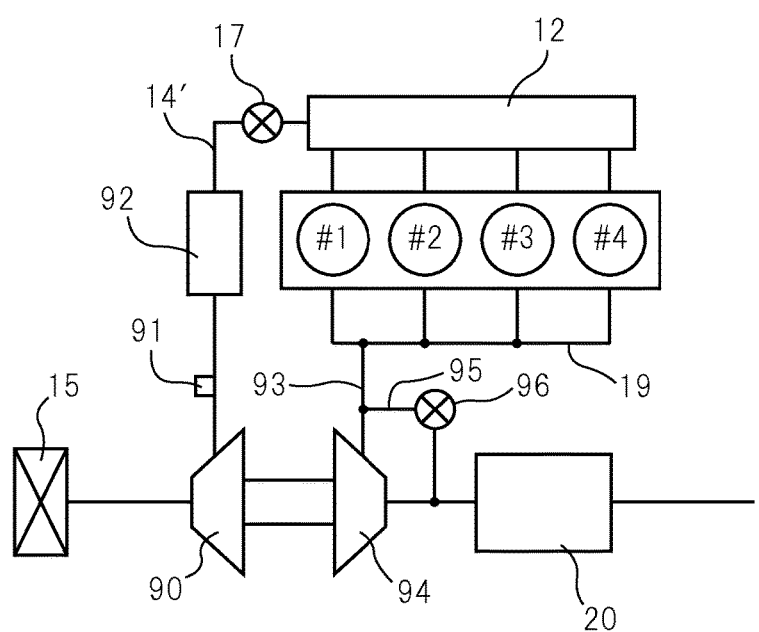
FIG. 10 is a schematic overview of an internal combustion engine in the case where a turbocharger is arranged.

FIG. 10 is a schematic overall view of an internal combustion engine which shows arrangement of a turbocharger. In the figure, members which were explained in FIG. 1 are assigned the same reference numerals and explanations will be omitted. In the present embodiment, a compressor 90 of the turbocharger is arranged at the intake duct 14' between the surge tank 12 and the air cleaner 15.

91 is a supercharging pressure sensor for measuring the intake pressure at the downstream side of the compressor 90 of the turbocharger of the intake duct 14' as the supercharging pressure, while 92 is an intercooler for cooling the intake which is supercharged by the compressor 90 of the turbocharger.

On the other hand, at the exhaust duct 93 at the downstream side of the exhaust manifold 19, a turbine 94 of the turbocharger is arranged at the upstream side of the catalyst device 20. 95 is a wastegate passage which bypasses the turbine 94, while a wastegate valve 96 which controls the amount of exhaust which passes through the wastegate passage 95 is arranged at the wastegate passage 95.

The larger the opening degree of the wastegate valve 96 is made, the greater the amount of exhaust gas which passes through the wastegate passage 95 and does not pass through the turbine 94, so the turbine speed falls and the supercharging pressure by the compressor 90 falls.

Figure 11:
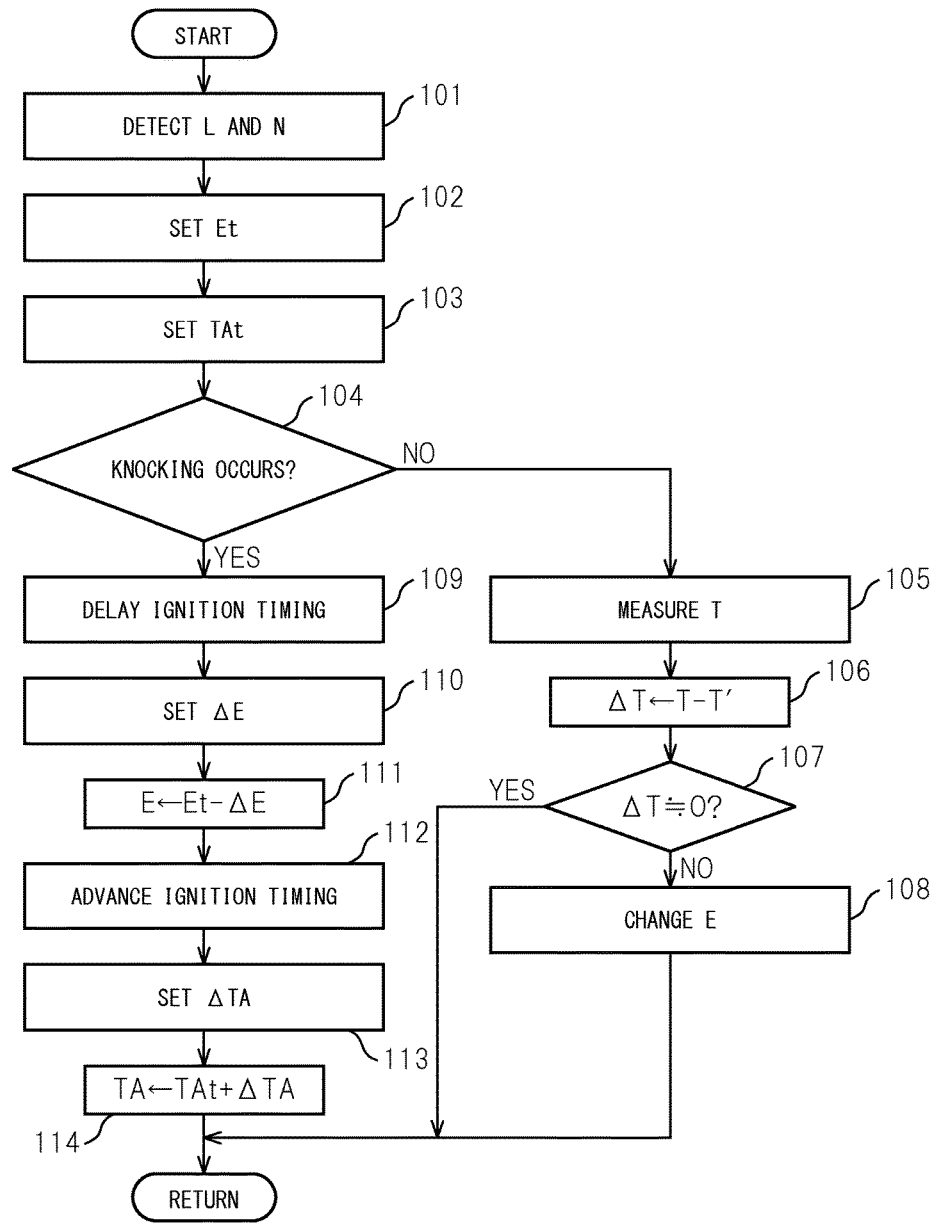
FIG. 11 is a flow chart for control of the mechanical compression ratio and an opening degree of the wastegate valve.

The present internal combustion engine is designed so that the target mechanical compression ratio Et of the variable compression ratio mechanism A and the target opening degree TAt of the wastegate valve 96 are set in accordance with the flow chart which is shown in FIG. 11 and so that the mechanical compression ratio and the opening degree of the wastegate valve 96 are controlled. This flow chart is followed repeatedly by the electronic control unit 30 every set time period.

First, at step 101, the load sensor 41 is used to detect the current engine load L, and the crank angle sensor 42 is used to detect the current engine speed N. Next, at step 102, the target mechanical compression ratio Et of the variable compression ratio mechanism A is set for the current steady engine operating state which is determined by the current engine load L and the current engine speed N. In the present embodiment, as shown in FIG. 9, the target mechanical compression ratio Et is mapped for the current engine load L. The variable compression ratio mechanism A is controlled so as to realize the thus set target mechanical compression ratio Et.

Next, at step 103, the target opening degree TAt of the wastegate valve 96 is set for the current steady engine operating state. The target opening degree TAt, for example, is mapped for the current engine load L and the current engine speed N so that the desired supercharging pressure is realized at each engine operating state. For example, the higher the engine load L, the higher the desired supercharging pressure is set. The target opening degree TAt is mapped for the current engine load L and the current engine speed N to realize the desired turbine speed and obtain the desired supercharging pressure at the exhaust gas pressure and temperature of the current engine operating state. The wastegate valve 96 is controlled so as to realize the thus set target opening degree TAt.

Next, at step 104, a knocking sensor which is arranged at each cylinder is used to judge if knocking is occurring at one or more cylinders. The knocking sensors can detect the sound, vibration, combustion pressure, etc. in the combustion chambers when knocking occurs. When no knocking occurs at any of the cylinders, the judgment at step 104 is no and the routine proceeds to step 105.

To realize the target mechanical compression ratio Et, the actuator of the variable compression ratio mechanism A, that is, the drive motor 59, is controlled so that the amount of operation becomes an amount of operation which corresponds to the current target mechanical compression ratio Et. The amount of operation of the drive motor 59 (the number of the rotations including a component less than a decimal point as well) may be directly detected by a specific sensor (not shown), but may also be indirectly detected based on the relative position between the crankcase 1 and the cylinder block 2 which is detected by the above-mentioned relative position sensor 22 or the rotational angle of the camshaft 55 which is detected by the above-mentioned cam rotational angle sensor 25.

However, even if the drive motor 59 of the variable compression ratio mechanism A is controlled in this way, sometimes the above-mentioned sensors will not accurately detect the amount of operation of the drive motor 59, and sometimes the current target mechanical compression ratio Et will not be realized.

At step 105, a temperature sensor 28 which is arranged at the exhaust manifold 19 is used to measure the current exhaust gas temperature T. At step 106, the difference ΔT between the measured current exhaust gas temperature T and the exhaust gas temperature T' when the target mechanical compression ratio Et is realized in the current engine operating state (mapped in advance for each engine operating state) is calculated. If the difference ΔT is 0, the target mechanical compression ratio Et is realized, but if the difference ΔT is positive, the larger the absolute value of the difference ΔT, the lower the actual mechanical compression ratio (expansion ratio) from the target mechanical compression ratio. Further, if the difference ΔT is negative, the larger the absolute value of the difference ΔT, the higher the actual mechanical compression ratio (expansion ratio) from the target mechanical compression ratio.

At step 107, it is judged if the difference ΔT is substantially 0. When the judgment is yes, the routine ends as it is. However, when the judgment at step 107 is no, at step 108 the variable compression ratio mechanism A is used to change the mechanical compression ratio so that the mechanical compression ratio matches the target mechanical compression ratio Et. For example, it is also possible to gradually control the mechanical compression ratio by feedback control so that the difference ΔT becomes 0. Further, it is also possible to change the mechanical compression ratio based on a predetermined amount of change so as to make the difference ΔT 0.

On the other hand, when knocking occurs at one or more cylinders, the judgment at step 104 is yes and, at step 109, at the knocking cylinder, the ignition timing is gradually retarded until knocking no longer occurs. In this way, knocking can be immediately suppressed. However, due to the retardation in the ignition timing, the torque which is generated by the cylinder at which knocking occurred falls, so lowering the mechanical compression ratio to prevent retardation in the ignition timing enables the generated torque to be raised without causing knocking.

Figure 12:
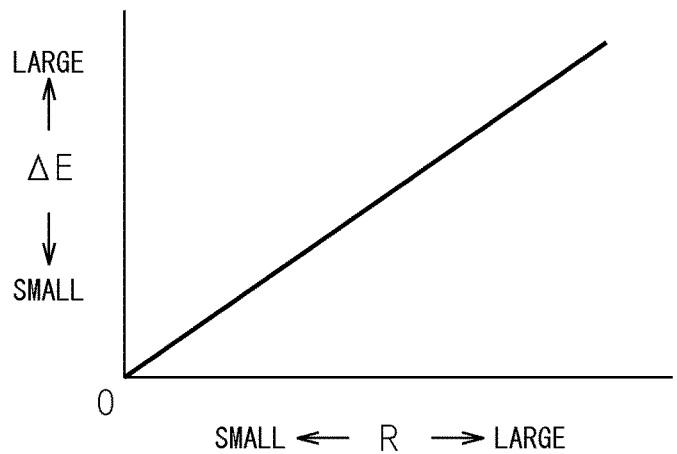
FIG. 12 is a map which shows a relationship between an amount of retardation of an ignition timing and an amount of change of the mechanical compression ratio.

Due to this, at step 111, the amount of change ΔE of the mechanical compression ratio is set from the map which is shown in FIG. 12. In the map which is shown in FIG. 12, the larger the amount of retardation R in the ignition timing of the cylinder in which knocking occurred (when knocking occurred in several cylinders, the maximum value of the amounts of retardation of the cylinders), the larger the amount of change ΔE of the mechanical compression ratio becomes. The map which is shown in FIG. 12 is that of a specific engine operating state. The amount of change ΔE of the target mechanical compression ratio for the amount of retardation R is set similarly as in FIG. 12. Next, at step 111, the mechanical compression ratio E is changed to the side of the current target mechanical compression ratio Et minus exactly the amount of change ΔE. Next, at step 112, the ignition timings of all of the cylinders in which knocking occurred are advanced. In this way, the retarded ignition timings of all of the cylinders in which knocking occurred are returned to their original states, but the mechanical compression ratio E is changed to the decreasing side, so knocking will no longer occur.

However, if changing the mechanical compression ratio E when the engine operating state is not changing in this way, the expansion ratio will be changed and therefore the thermal efficiency will also change, so the temperature and pressure of the exhaust gas will change. At this time, if assuming the engine operating state is not changing and leaving as is the target opening degree TAt of the wastegate valve 96 for the current engine operating state, it will end up not being possible to control the supercharging pressure of the turbocharger to the desired supercharging pressure.

Figure 13:
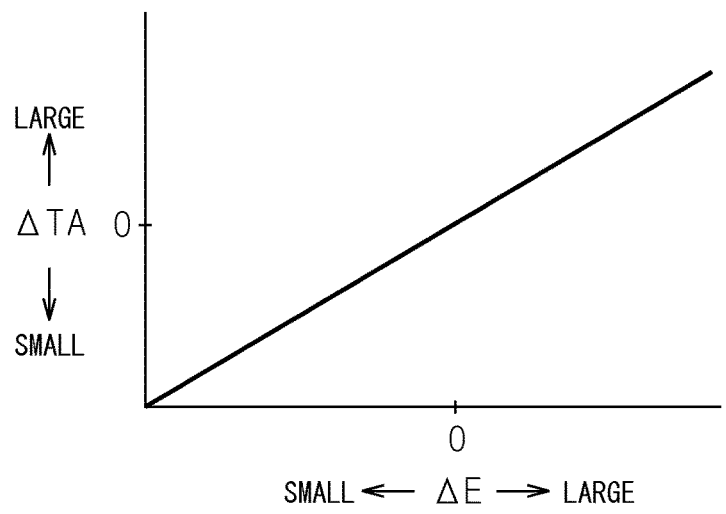
FIG. 13 is a map which shows a relationship between an amount of change of the mechanical compression ratio and an amount of correction of a target opening degree of the wastegate valve.

In the present flow chart, at step 113, the target amount of correction ΔTA of the opening degree TAt is set based on the map which is shown in FIG. 13. In the map which is shown in FIG. 13, the larger the amount of change ΔE of the mechanical compression ratio E which is set at step 110, the larger the amount of correction ATA becomes. The map which is shown in FIG. 13 is for a specific engine operating state. The amount of correction ΔTA of the target opening degree TAt with respect to the amount of change ΔE of the mechanical compression ratio for each engine operating state is set similarly as in FIG. 13. Next, at step 114, the current target opening degree TAt of the wastegate valve 96 is corrected to the increasing side by the amount of correction ATA.

In this way, at step 111, the lower the mechanical compression ratio E is changed from the target mechanical compression ratio Et, the more to the increasing side the target opening degree TAt of the wastegate valve 96 is corrected from the current engine operating state. Due to this, if the mechanical compression ratio E is made lower, the expansion ratio also becomes lower and the thermal efficiency deteriorates, so the exhaust gas temperature and pressure become higher. If left as is, the supercharging pressure ends up becoming excessive, but by the opening degree of the wastegate valve 96 being made larger and the rise in turbine speed being suppressed, the supercharging pressure of the turbocharger can be controlled to the desired supercharging pressure.

In this way, if the mechanical compression ratio E is changed when the engine operating state is not changing, the current target opening degree TAt of the wastegate valve 96 is corrected, but the target opening degree TAt of the wastegate valve 96 for the current engine operating state is one which is predicated on the target mechanical compression ratio Et of the current engine operating state being realized, so when changing the mechanical compression ratio E to the target mechanical compression ratio Et of the current engine operating state at step 108, even if the mechanical compression ratio E is changed when the engine operating state is not changing, the target opening degree TAt of the wastegate valve 96 for the current engine operating state is not corrected.

Further, when, to suppress the occurrence of knocking, changing the mechanical compression ratio to the decreasing side when the engine operating state is not changing, it is also possible to increase the amount of correction ΔTA which is set at step 113 the larger the number of cylinders at which knocking did not occur. For example, if the number of cylinders at which knocking did not occur is "n", it is sufficient to use the value which is "k·n" times as large as the amount of correction ΔTA of the target opening degree TAt which was set at step 113. Due to this, the larger the number of cylinders at which knocking did not occur, the more to the increasing side the target opening degree TAt of the wastegate valve 96 for the current engine operating state is corrected to.

The actual mechanical compression ratio sometimes varies at each cylinder. It is considered that the actual mechanical compression ratio of a cylinder at which knocking occurs becomes higher than the actual mechanical compression ratio of a cylinder at which knocking has not occurred. At this time, if lowering the overall mechanical compression ratio so as to suppress knocking, at the cylinders at which knocking occurred, the actual mechanical compression ratio will not fall that much from the target mechanical compression ratio, but at the cylinders at which knocking did not occur, the actual mechanical compression ratio will greatly fall from the target mechanical compression ratio and the thermal efficiency will also greatly deteriorate, so the larger the number of cylinders at which knocking did not occur, the more to the increasing side the target opening degree TAt of the wastegate valve 96 for the current engine operating state is corrected, so it is possible to control the supercharging pressure of the turbocharger to the desired supercharging pressure and keep the supercharging pressure from excessively rising.

Further, the mechanical compression ratio is changed to the decreasing side when the engine operating state is not changing at the time that knocking occurs, but when the engine operating state is not changing, if changing the mechanical compression ratio to the increasing side for other reasons, the higher the mechanical compression ratio E is made from the target mechanical compression ratio Et (in the map shown in FIG. 13, ΔE becomes negative), the more to the decreasing side the target opening degree TAt of the wastegate valve 96 for the current engine operating state is corrected to (in the map shown in FIG. 13, ΔTA becomes negative). Due to this, if the mechanical compression ratio E is made higher, the expansion ratio also becomes higher and the thermal efficiency is improved, so the exhaust gas temperature and pressure become lower and, if left as is, the supercharging pressure ends up becoming excessively low, but the opening degree of the wastegate valve 96 is made small and the drop in the turbine speed is suppressed so it is possible to control the supercharging pressure of the turbocharger to the desired supercharging pressure.

In the present flow chart, at step 105, a temperature sensor 28 which is arranged at the exhaust manifold 19 is used to measure the current exhaust gas temperature T, and the difference ΔT between the measured current exhaust gas temperature T and the exhaust gas temperature T' when the target mechanical compression ratio Et is realized in the current engine operating state is used as the basis to judge if the target mechanical compression ratio Et has been realized, but, for example, the exhaust gas pressure of the exhaust manifold 19 is also a value which changes in accordance with the actual mechanical compression ratio (expansion ratio). It is also possible to measure the current exhaust gas pressure with an exhaust gas pressure sensor 29, use the difference between the measured current exhaust gas pressure and the exhaust gas pressure when the target mechanical compression ratio Et is realized at the current engine operating state (preferably mapped in advance) is used as the basis to judge if the target mechanical compression ratio Et has been realized, and change the mechanical compression ratio so that the target mechanical compression ratio Et is realized.

In this regard, at the time of engine transition when the amount of depression of the accelerator pedal changes from S1 to S2 and the engine operating state changes, as shown in FIG. 14 by the solid line, for example, the opening degree of the throttle valve 17 is made to change at maximum speed by the actuator 16 from the first opening degree TA1 which corresponds to the engine operating state before change to the second opening degree TA2 which corresponds to the engine operating state after change, the closing timing of the intake valve 7 is also made to change at maximum speed by the variable valve timing mechanism B from the first valve closing timing IVC1 which corresponds to the engine operating state before change to the second valve closing timing IVC2 which corresponds to the engine operating state after change, and the mechanical compression ratio is also made to change at maximum speed by the variable compression ratio mechanism A from the first mechanical compression ratio E1 which corresponds to the engine operating state before change to the second mechanical compression ratio E2 which corresponds to the engine operating state after change.

Further, the amount of intake at each instant at the time of engine transition is estimated, as shown in FIG. 14 by the solid line, for the thus changed opening degree of the throttle valve 17, closing timing of the intake valve 7, and mechanical compression ratio. In this way, target opening degree of the wastegate valve 96 at the engine operating state at each instant is set for the estimated amount of intake at each instant so as to realize the desired supercharging pressure at each instant.

However, even if controlling the opening degree of the wastegate valve 96 to the target opening degree at each instant at the time of engine transition in this way, the actual mechanical compression ratio will not change as shown by the solid line as intended but will change as shown by the broken line due to the response delay, so the intended temperature and pressure of the exhaust gas will not be realized at each instant at the time of engine transition, so the actual supercharging pressure will change as shown by the broken line due to the response delay of the mechanical compression ratio and the desired supercharging pressure cannot be realized.

Due to this, in the present embodiment, at the time of engine transition, the target opening degree of the wastegate valve 96 at the engine operating state at each instant is corrected as shown by the broken line, based on the actual mechanical compression ratio at each instant which is estimated based on the relative position at each instant detected by the relative position sensor 22, so that the desired supercharging pressure at each instant is realized.

Specifically, when, at each instant, the actual mechanical compression ratio is higher than the intended mechanical compression ratio, the temperature and pressure of the exhaust gas become lower than the intended value, so the target opening degree of the wastegate valve 96 is corrected to become smaller and the amount of correction at each instant is made larger the larger the difference between the actual mechanical compression ratio and the intended mechanical compression ratio at each instant. Further, when, at each instant, the actual mechanical compression ratio is lower than the intended mechanical compression ratio, the temperature and pressure of the exhaust gas are made higher than the intended value, so the target opening degree of the wastegate valve 96 is corrected so as to become larger. The amount of correction at each instant is made larger the larger the difference between the actual mechanical compression ratio and the intended mechanical compression ratio at each instant.

Further, the change in the actual mechanical compression ratio which is shown by the broken line in FIG. 14 is estimated based on the relative position at each instant which is detected by the relative position sensor 22 and includes the response delay of the relative position sensor 22 itself, so, as shown in FIG. 14 by the one-dot chain line, if accurately estimating the actual mechanical compression ratio and using the difference between the accurate estimated value of the mechanical compression ratio and the intended mechanical compression ratio at each instant as the basis to correct the target opening degree of the wastegate valve 96, it is possible to more accurately realize the desired supercharging pressure.

In this way, according to the present embodiment, the opening degree of the wastegate valve is controlled to the target opening degree for each engine operating state. At the time when changing the mechanical compression ratio when the engine operating state is not changing or at the time of engine transition, the target opening degree of the wastegate valve for the current engine operating state is corrected. Due to the change of the mechanical compression ratio, the expansion ratio changes and the thermal efficiency also changes, so the temperature and pressure of the exhaust gas change. If assuming the engine operating state is not changing and leaving as is the target opening degree of the wastegate valve for the current engine operating state, it ends up becoming impossible to control the supercharging pressure of the turbocharger to the desired supercharging pressure. Due to this, at this time, the target opening degree of the wastegate valve for the current engine operating state is corrected based on the changed mechanical compression ratio, so it is possible to control the supercharging pressure of the turbocharger to the desired supercharging pressure.

Further, when changing the mechanical compression ratio at the time of engine transition, if leaving as is the target opening degree of the wastegate valve for the current engine operating state, which changes with each instant, it ends up being not possible to control the supercharging pressure of the turbocharger to the desired supercharging pressure due to the response delay of the mechanical compression ratio. Therefore, at this time, the target opening degree of the wastegate valve for the current engine operating state, which changes with each instant, is corrected based on the actual mechanical compression ratio, so it is possible to control the supercharging pressure of the turbocharger to the desired supercharging pressure.

REFERENCE SIGNS LIST

90 compressor of turbocharger
91 supercharging pressure sensor
94 turbine of turbocharger
95 wastegate passage
96 wastegate valve
A variable compression ratio mechanism
B variable valve timing mechanism

The invention claimed is:

1. An internal combustion engine comprising:
a variable compression ratio mechanism;
a turbocharger; and
an electronic control unit;
wherein
the electronic control unit further includes a processor, memory, an input port for receiving signals from a plurality of sensors located on the internal combustion engine, and an output port for outputting signals to the internal combustion engine, the turbocharger, and the variable compression ratio mechanism;
the electronic control unit controls an opening degree of a wastegate valve to a target opening degree with respect to each engine operating state via the variable compression mechanism; and
when changing a mechanical compression ratio is decreasing, the electronic control unit controls to increase the target opening degree of the wastegate valve with respect to a current engine operating state.

2. The internal combustion engine provided with the variable compression ratio mechanism according to claim 1, wherein when changing the mechanical compression ratio to a target mechanical compression ratio with respect to the current engine operating state when an engine operating state is not changing, the electronic control unit maintains the target opening degree of the wastegate valve with respect to the current engine operating state.

3. The internal combustion engine provided with the variable compression ratio mechanism according to claim 1, wherein when, to suppress knocking in a number of cylinders of the internal combustion engine, changing the mechanical compression ratio is decreasing when an engine operating state is not changing, the electronic control unit controls to further increase the target opening degree of the wastegate valve with respect to the current engine operating state.

4. The internal combustion engine provided with the variable compression ratio mechanism according to claim 1, wherein when changing a mechanical compression ratio is increasing, the electronic control unit controls to decrease the target opening degree of the wastegate valve with respect to the current engine operating state.

* * * * *